(12) United States Patent
Robinson

(10) Patent No.: US 6,408,067 B1
(45) Date of Patent: Jun. 18, 2002

(54) METHODS AND APPARATUS FOR INTERCEPTING DUAL-TONE MULTI-FREQUENCY (DTMF) SIGNALS AND FOR REDIALING THE INTERCEPTED SIGNALS WITH ADDITIONAL DTMF SIGNALS

(75) Inventor: Jeffrey I. Robinson, New Fairfield, CT (US)

(73) Assignee: IQ Systems, Inc., Sandy Hook, CT (US)

( * ) Notice: Subject to any disclaimer, the term of this patent is extended or adjusted under 35 U.S.C. 154(b) by 0 days.

(21) Appl. No.: 09/182,037

(22) Filed: Oct. 29, 1998

(51) Int. Cl.$^7$ ................................................ H04M 3/00
(52) U.S. Cl. .................. 379/355.08; 379/386
(58) Field of Search ....................... 379/355.01, 355.02, 379/355.03, 355.04, 355.05, 355.06, 355.07, 355.08, 386

(56) References Cited

U.S. PATENT DOCUMENTS

| | | | |
|---|---|---|---|
| 4,791,550 A | * 12/1988 | Stevenson et al. | 364/200 |
| 5,036,459 A | * 7/1991 | den Haan et al. | 364/200 |
| 5,095,522 A | * 3/1992 | Fujita et al. | 395/200 |
| 5,165,018 A | * 11/1992 | Simor | 395/300 |
| 5,241,673 A | * 8/1993 | Schelvis | 395/600 |
| 5,398,336 A | * 3/1995 | Tantry et al. | 395/600 |
| 5,430,850 A | * 7/1995 | Papadopoulos | 395/375 |
| 5,550,976 A | * 8/1996 | Henderson et al. | 395/200.06 |

OTHER PUBLICATIONS

Article, "Distributed Operating Systems Combine Multiple Processors into a single machine", by Richard Quinell, EDN, Sep. 28, 1995, pp. 39–44.*

* cited by examiner

Primary Examiner—Forester W. Isen
Assistant Examiner—Jefferey F Harold
(74) Attorney, Agent, or Firm—David P. Gordon; David S. Jacobson; Thomas A. Gallagher

(57) ABSTRACT

The apparatus of the invention (a) monitors a subscriber line for the presence of DTMF tones, (b) intercepts DTMF tones by transmitting a set of DTMF harmonics onto the subscriber line, (c) detects the intercepted DTMF tones and records them or the digits they represent, (d) analyzes the intercepted digits to determine whether a long distance number has been dialed, and (e) if a long distance call has been dialed, transmits onto the subscriber line a DTMF signal which includes the intercepted DTMF signal plus a service provider access code DTMF signal inserted before it. According to a presently preferred embodiment, the apparatus includes a voltage sensor which detects a drop in voltage whenever a phone connected to the same subscriber line as the apparatus goes off-hook. The voltage detector turns the apparatus "ON" when an off-hook condition is detected. The preferred apparatus also includes an energy sensor which rapidly detects the presence of any fixed frequency tone and triggers a harmonics tone generator which preferably generates second harmonics of each of the "row frequencies". Thus, all DTMF tones are blocked before they are recognized.

19 Claims, 4 Drawing Sheets

METHODS AND APPARATUS FOR INTERCEPTING DUAL-TONE MULTI-FREQUENCY (DTMF) SIGNALS AND FOR REDIALING THE INTERCEPTED SIGNALS WITH ADDITIONAL DTMF SIGNALS

BACKGROUND OF THE INVENTION

1. Field of the Invention

The invention relates to telephone signalling. More particularly, the invention relates to methods and apparatus for intercepting DTMF dialing signals and redialing the intercepted signals with additional DTMF signals appended to or embedded in the intercepted signals.

2. State of the Art

Telephone technology has evolved in the twentieth century from a relatively simple concept to a vastly complex system. Some of the most significant changes have been in telephone switching techniques. Early telephones were switched manually. Individual telephone operators provided interconnections between subscribers by plugging a wire connected to the calling telephone set into a switchboard in order to connect it to a wire connected to the called telephone set. The first automatic telephone switching exchange used step-by-step switches with 10×10 switching fields to connect two digits of a dialed number. Later, crossbar switches were developed and are still in use in many parts of the world today. A crossbar switch includes a rectangular array of electromagnets each of which activate mechanical linkages to close a set of contacts. During the nineteen sixties and seventies, many telephone companies replaced the mechanical crossbar switches with solid state electronic switches which have a much higher capacity in the number of subscribers served by a single switch. Electronic switches provide many advantages over electromechanical switches, one of which is that they enable tone dialing.

The early electromechanical switches responded to DC "dial pulses" which are still used by some telephones today. The dial pulses are generated by a rotary mechanical switch in a subscriber's telephone which results in alternating "on-hook" and "off-hook" signals. More particularly, dial pulses occur at a nominal rate of ten hertz with a break period of 61% (or about 60 milliseconds) and a closed circuit period of approximately 40 milliseconds. Digits dialed are indicated by the number of break periods. For example, the digit three is indicated by three openings of the dial contacts. The higher the cardinality of the digit, the longer it takes to dial the digit. In other words, it takes 1 second to dial the digit zero, nine tenths of a second to dial the digit nine, etc. As mentioned above, the advent of electronic exchange switching has enabled the implementation of tone dialing. The international standard for tone dialing is known as dual-tone multi-frequency (DTMF) signalling. The DTMF system uses eight tones having very specific frequencies. Signalling is effected by transmitting tones in pairs. The DTMF tones are generated in the subscriber's telephone when buttons on the phone are pressed. The DTMF standard supports sixteen DTMF signals but typically only twelve (digits 0–9 and symbols * and #) are used. The additional signals (usually referred to as A–D) are used in signalling between switches). Table 1 illustrates the assignment of tones to the standard twelve dialing signals.

TABLE 1

| Frequency (Hz) | 1209 | 1336 | 1477 | 1633 |
|---|---|---|---|---|
| 697 | 1 | 2 | 3 | A |
| 770 | 4 | 5 | 6 | B |
| 852 | 7 | 8 | 9 | C |
| 941 | * | 0 | # | D |

As seen in Table 1, four "row frequencies" 697 Hz, 770 Hz, 852 Hz, 941 Hz, and four "column frequencies" 1209 Hz, 1336 Hz, 1477 Hz, and 1633 Hz form a sixteen cell matrix within which DTMF signals are defined. For example, the digit 1 is signalled by transmitting a 697 Hz tone and a 1209 Hz tone simultaneously. The digit 9 is signalled by transmitting a 852 Hz tone and a 1477 Hz tone simultaneously. The minimum duration of each DTMF signal is approximately 40 milliseconds and the minimum time between DTMF signals is also approximately 40 milliseconds. The minimum time it takes to "dial" a digit with DTMF signalling is independent of the cardinality of the digit dialed.

The DTMF frequencies were chosen so that all of the tones would be easily transmitted within the limited bandwidth of a voice telephone circuit (about 300–3,000 Hz) and so that no tone is an harmonic of another tone. The elimination of harmonics was intended to enable DTMF tone detectors to correctly discriminate between DTMF signals and melodious human speech. Human speech is rich in harmonic tones and that is one reason why computer generated speech rarely sounds like true human speech. According to the DTMF detection system, if an harmonic of a DTMF tone is detected together with the tone, the tone is not recognized as a DTMF signal component.

One of the primary advantages of DTMF dialing is that digits can be dialed much faster and more accurately with push buttons using DTMF tones than with a rotary dial. For example, a ten digit telephone number can be dialed (by a device) using DTMF in 760 milliseconds. Using pulse dialing, a ten digit telephone number will take, on average, about five seconds to dial. The importance of rapid dialing is increasing because of political and technological changes in the public telephone network. Technologically, the seven digit telephone number is becoming a thing of the past since the number of subscriber lines installed in some urban areas exceeds 9,999,999 (the actual number of seven digit telephone numbers is less than ten million because of certain dialing conventions and reserved numbers). Thus, it is becoming common in many urban areas that even "local calls" require the dialing of an area code. Politically, when the telephone monopoly in the U.S. ended, competing service providers required the dialing of "access codes" in order to select among different service providers at the time a call is made. Originally, the access codes consisted of five digits in the form 1-0-x-x-x, where the digits x-x-x identified a particular service provider. Recently, the format of access codes has been changed to seven digits in the form 1-0-x-x-x-x-x in order to accommodate more competing service providers. Thus, the number of digits presently required to make a call with a selected service provider is eighteen (seven for the access code, seven for the phone number, and four for 1+area code). International calls require even more digits. Many service providers are finding that consumers are unwilling to dial so many digits (even with a push button phone). The competing service providers are therefore losing business to the default service provider initially chosen by the consumer. In addition, consumers are reluctant to choose a different service provider on a call by call basis because of the need to dial many more digits.

In view of the foregoing, it is apparent that consumers need some relief from the number of digits needed to be dialed when using a service provider which is selected by the dialing of an access code. One possible solution is to program a telephone having a memory with the seven digit access code and assign that number to a "speed dial" button. However, not all telephones have memory or speed dialing features. In addition, the typical household has many "extension" telephones and each telephone would need to be programmed with the speed dialing access code.

SUMMARY OF THE INVENTION

It is therefore an object of the invention to provide methods and apparatus by which a telephone user can access a telephone service provider without dialing the access code normally required to access the provider.

It is also an object of the invention to provide methods and apparatus which automatically insert a service provider access code when a long distance number is dialed.

It is another object of the invention to provide methods and apparatus by which all extension telephones on a single subscriber line can automatically access a telephone service provider without dialing the access code normally required to access the provider and without programming each of the telephone extensions.

It is a further object of the invention to provide methods and apparatus for intercepting DTMF dialing signals and redialing the intercepted signals with additional DTMF signals appended to or embedded in the intercepted signals.

Another object of the invention is to provide a single apparatus for intercepting DTMF dialing signals and redialing the intercepted signals with additional DTMF signals appended to or embedded in the intercepted signals, which single apparatus intercepts signals from all extension phones coupled to a single subscriber line.

In accord with these objects which will be discussed in detail below, the methods of the present invention include (a) monitoring a subscriber line for the presence of DTMF tones, (b) intercepting DTMF tones by transmitting a set of DTMF harmonics onto the subscriber line to prevent a central office (CO) from detecting a DTMF signal, (c) detecting the intercepted DTMF tones and recording them or the digits they represent, (d) analyzing the intercepted digits to determine whether a long distance number has been dialed, and (e) if a long distance call has been dialed, transmitting onto the subscriber line a DTMF signal which includes the intercepted DTMF signal plus a service provider access code DTMF signal inserted before it, and if a local call has been dialed, transmitting the intercepted signal without the access code.

An apparatus according to the present invention includes (i) a modified DTMF sensor, (ii) a harmonics tone generator, (iii) a temporary memory for storing the intercepted DTMF tones or the digits the intercepted tones represent, (iv) a permanent memory for storing a service provider access code or the DTMF signal representing the access code, (v) logic for analyzing the intercepted digits, and (vi) a dialer for dialing the intercepted digits and the access code.

According to presently preferred embodiments of the invention, the apparatus includes a voltage sensor which detects a drop in voltage whenever a telephone set connected to the same subscriber line as the apparatus goes off-hook. The voltage detector turns the apparatus "ON" when an off-hook condition is detected. The presently preferred apparatus also includes an energy sensor which rapidly detects the presence of any fixed frequency tone and triggers the harmonics tone generator. The harmonics tone generator preferably generates the second harmonic of each of the "row frequencies" of the DTMF standard. Thus, all DTMF tones are intercepted before they are recognized. The modified DTMF sensor includes means for filtering out the four harmonics generated by the harmonics tone generator. This arrangement assures that any DTMF tone generated by a phone connected to the subscriber line is intercepted and recognized within 40 milliseconds, the minimum time it takes a CO to recognize the DTMF tone. According to the preferred embodiment, as the tones are recognized, the digits the tones represent are stored in a temporary memory for analysis by control logic. The control logic determines what type of number has been dialed (e.g. local, long distance, international) and determines whether an access code should be inserted before the dialed number. The logic then causes the dialer to dial the number and, if appropriate, to dial the access number first. In addition, the logic turns the apparatus "OFF" after the dialer has finished dialing. This prevents the energy sensor from triggering the harmonics generator during voice traffic. The apparatus will thus remain idle until a new off-hook condition is recognized.

According to one embodiment of the invention, an international call (i.e. a call which does not have a fixed number of digits) is recognized by the prefix "011" but the end of dialing is not automatically determined. After an international number is dialed, the person making the call must dial "#" to signal the apparatus to dial the number with the inserted access code. According to another embodiment, the apparatus is provided with a data base which analyzes international numbers to determine when dialing is completed.

According to still another embodiment of the invention, the apparatus is provided with a database of several access numbers for different service providers. The user may manually select from a menu of service providers by dialing #1, #2, etc. after dialing a number. According to yet another embodiment, the logic of the apparatus is programmed to automatically use the most economical service provider based on time of day, number dialed, etc.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
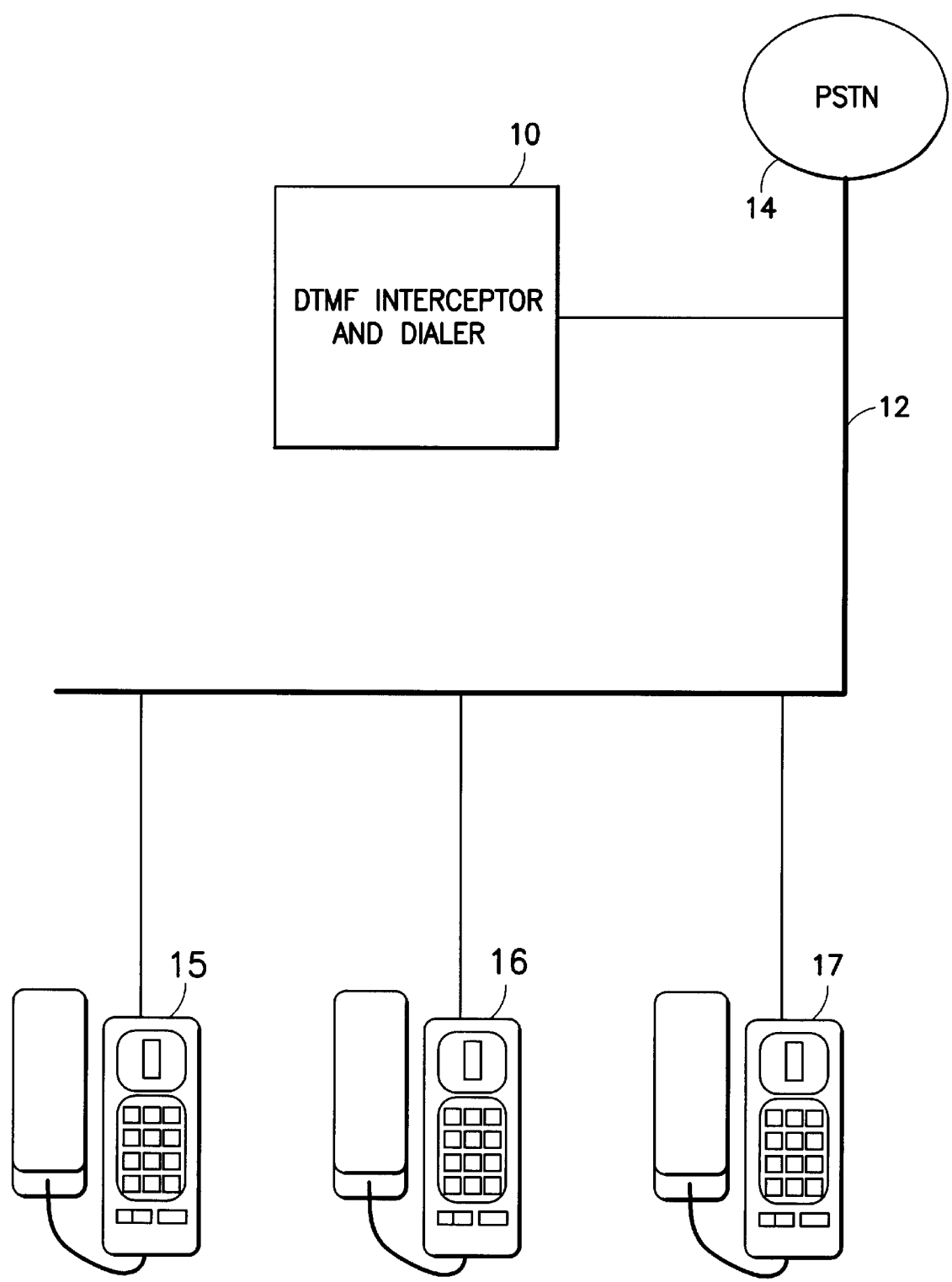
FIG. 1 is a schematic block diagram of a subscriber telephone line having several extension telephone sets with the invention coupled to the subscriber line.
Figure 2:
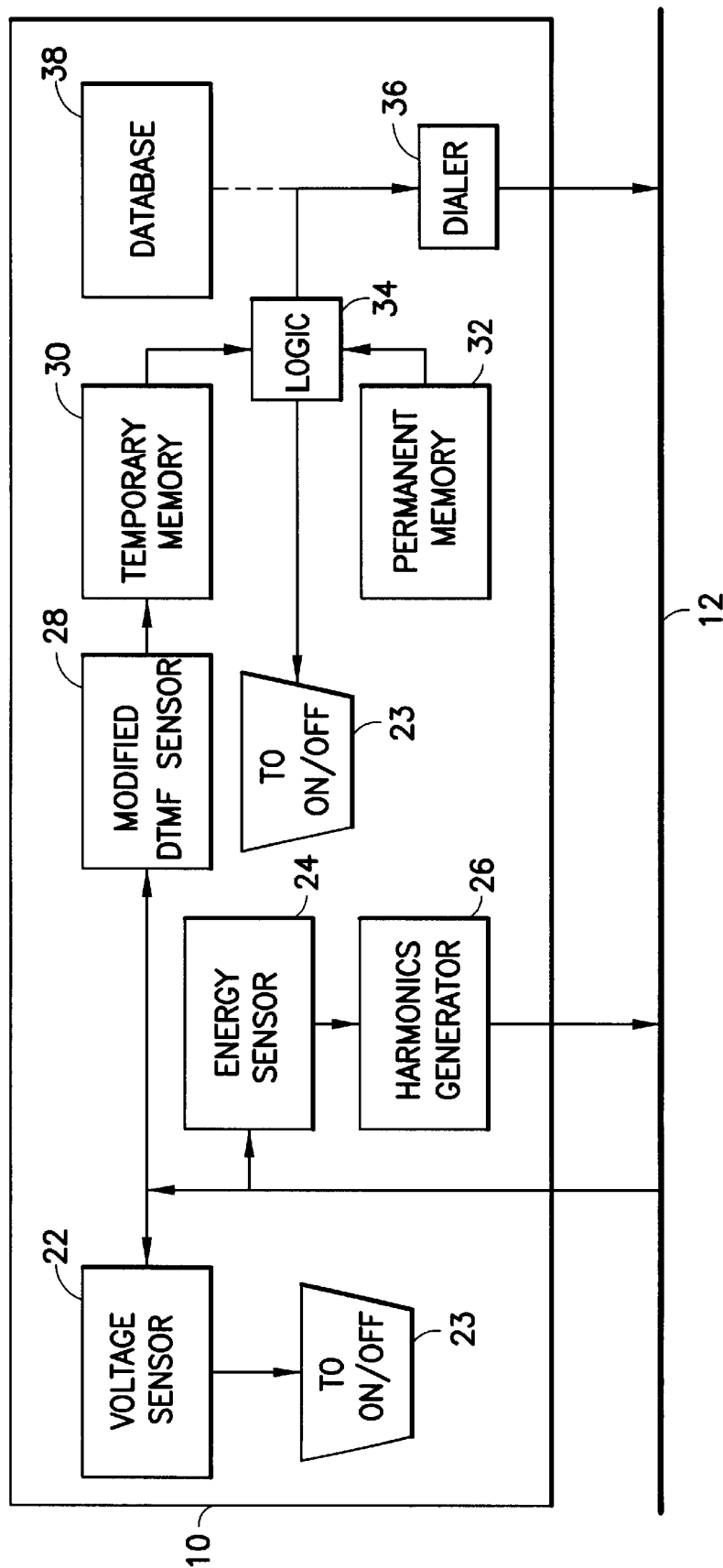
FIG. 2 is a schematic block diagram of an apparatus according to the invention.

Referring now to FIGS. 1 and 2, a DTMF interceptor and dialer 10 according to the invention is designed to be coupled to a telephone subscriber line 12 connected to the public switched telephone network (PSTN) 14. The DTMF interceptor and dialer 10, when so coupled, will intercept DTMF signals from all telephone sets, e.g. 15, 16, 17, coupled to the same subscriber line 12. The DTMF interceptor and dialer 10 generally includes a voltage sensor 22, an energy sensor 24, an harmonics generator 26, a modified DTMF sensor 28, a temporary memory 30, a permanent (i.e. non-volatile) memory 32, controller logic 34, and a dialer 36. Optionally, the DTMF interceptor and dialer 10 includes a programmable database 38 in lieu of or in addition to the permanent memory 32.

The voltage sensor 22, the energy sensor 24, and the modified DTMF sensor 28 each receive input from the subscriber line 12. The harmonics generator 26 and the dialer 36 each provide output to the subscriber line 12. More particularly, the voltage sensor 22 is coupled to a power switch 23 which turns the unit 10 "ON" when a voltage drop is detected by the voltage sensor 22 in the subscriber line 12. The energy sensor 24 is coupled to the harmonics generator 26 and activates the harmonics generator 26 when energy resembling a DTMF tone is sensed on the subscriber line 12. The purpose of the energy sensor is to rapidly detect a signal which may be a DTMF signal so that the masking harmonics can be generated before the network or CO can detect the presence of a DTMF signal, i.e. within the approximately 40 milliseconds it takes for the CO to detect a DTMF signal. The modified DTMF sensor 28 is coupled to the temporary memory 30 and stores either DTMF signals or the digits they represent in the memory 30 as the DTMF signals on the subscriber line 12 are recognized by the modified DTMF sensor 28. The modified DTMF sensor 28 is "modified" so that it will recognize DTMF tones in the presence of the DTMF harmonics generated by the harmonics generator 26. The controller logic 34 is coupled to the temporary memory 30, the permanent memory 32, the dialer 36, and the power switch 23 and turns the unit 10 "OFF" after a number has been dialed by the dialer 36.

Though not shown in the drawings, it will be appreciated that if the invention is to be used with a telephone which receives calls as well as makes calls, it will be necessary to detect when an incoming call is answered so that the unit is not turned ON in response to an off hook which is the result of answering an incoming call. One easy way of providing this functionality is to include a ring detector in the circuit 10 which is coupled to the subscriber line 12 and the logic 34.

Figure 3:
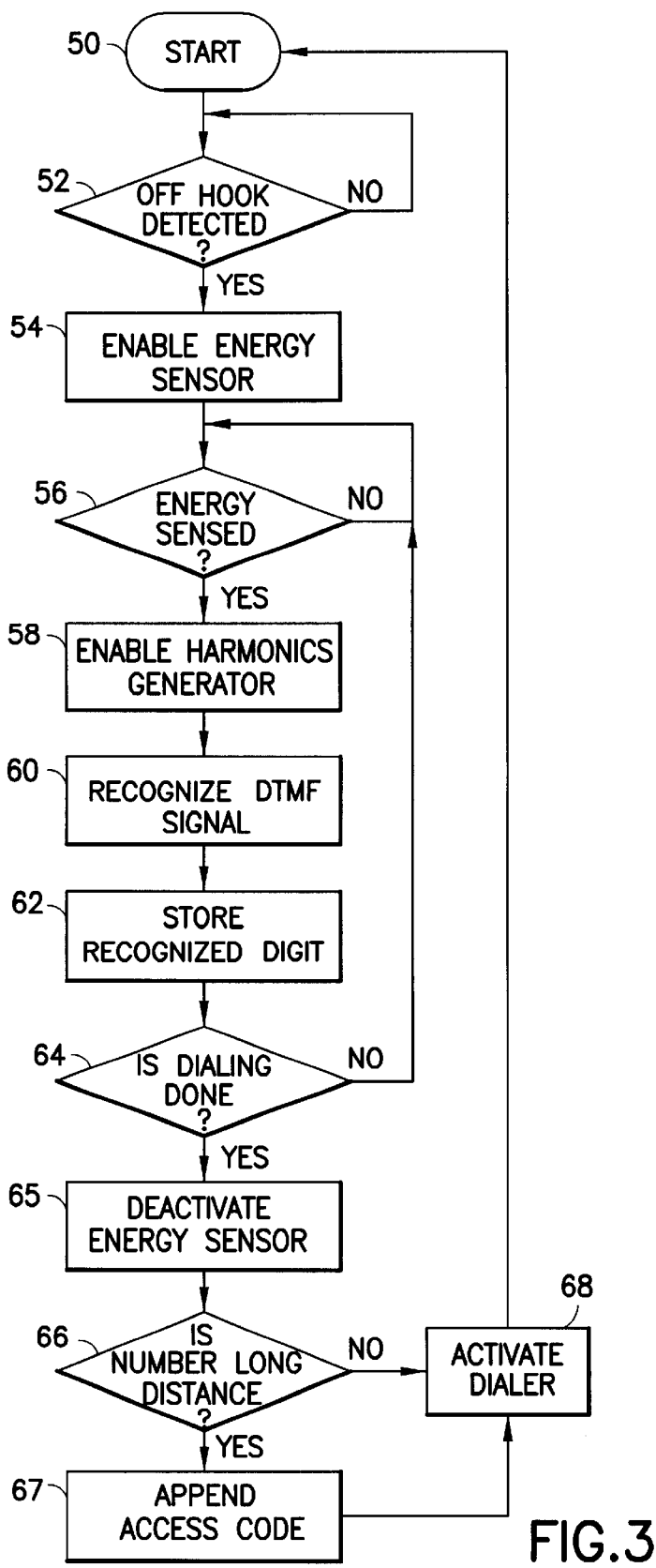
FIG. 3 is a flow chart illustrating the basic operation of the presently preferred embodiment.

Referring now to FIGS. 2 and 3, the DTMF interceptor and dialer 10 according to the invention, starting at 50 in FIG. 3, monitors the subscriber line 12 waiting for a telephone set (e.g., 15, 16, or 17 in FIG. 1) to go off-hook. An off-hook telephone is detected by the voltage sensor 22, at 52 in FIG. 3, as a drop in the voltage on the subscriber line 12. When an off-hook telephone is sensed, the energy sensor 24 is turned on at 54 in FIG. 3. As explained above, however, if the off hook condition follows a ring detection or is otherwise indicated as being in response to an incoming call, the energy sensor 24 is not activated and the system returns to an idle state at 50. The energy sensor 24 monitors the subscriber line 12 for energy which is indicative of a DTMF signal, e.g. a sine wave having one of the eight specified frequencies between 697 Hz and 1477 Hz. As soon as such a signal is detected, at 56 in FIG. 3, by the energy sensor 24, the harmonics generator 26 is activated, at 58 in FIG. 3.

According to a presently preferred embodiment, the harmonics generator generates four frequencies simultaneously, i.e. 1394 Hz, 1540 Hz, 1704Hz and 1882 Hz. These frequencies are the second harmonics of the "row frequencies" 697 Hz, 770 Hz, 852 Hz, and 941 Hz of the DTMF standard. So long as these second harmonics are transmitted onto the subscriber line 12, no DTMF signals from any of the extensions phones (15, 16, 17 in FIG. 1) connected to the subscriber line 12 will be recognized by the network (14 in FIG. 1). Thus, in order for the DTMF interceptor and dialer 10 to recognize the DTMF signals generated on the subscriber line, a modified DTMF sensor (28 in FIG. 2) recognizes DTMF signals, at 60 in FIG. 3, in the presence of the second harmonics generated by the harmonics generator 26. As the DTMF signals are recognized by the sensor 28, they or the digits they represent are stored, at 62 in FIG. 3, in the temporary memory 30. Although not specifically shown in FIG. 3, the harmonics generator is preferably shut "OFF" when the energy sensor 24 detects that no DTMF signal is present on the line 12.

As the DTMF signals are intercepted in the manner described above, the logic 34 determines, at 64 in FIG. 3, when the dialing is completed, i.e. when sufficient digits have been intercepted to make a telephone call. According to one embodiment of the invention, this determination is based on the number of digits dialed and the identity of the first digit. For example, if the first digit is "1", the logic will expect eleven digits to complete dialing. Similarly, if the first digit is greater than one, the logic will assume that the number dialed is a seven digit local number. International calls may be recognized by the initial digits being "011". It will be appreciated, however, that not all international calls have the same number of digits. According to one embodiment, the logic 34 determines when an international call is being dialed by detecting the "011" prefix and then waits until the "#" symbol is dialed to indicate that the number is complete. It will be appreciated that the logic also recognizes certain numbers such as "911" and "411" and causes those numbers to be dialed immediately without any additional tones being added. Further, the logic will recognize when "0" has been dialed without any following digits and will dial the operator. Once it is determined at 64 that a complete telephone number has been dialed, the energy sensor is deactivated at 65.

As shown in FIG. 3, the logic makes a determination at 66 whether the number dialed is a long distance number. This determination may be made simultaneously with the determination made at 64 that the dialing is done. In either case, according to a first embodiment of the invention, a long distance service provider access code, stored in the permanent (i.e. non-volatile) memory 32 (FIG. 2), is appended, at 67 in FIG. 3, to the beginning of the dialed number stored in the temporary memory 30 (FIG. 2). The logic 34 then activates the dialer 36 at 68 in FIG. 3 which transmits onto the subscriber line 12 the DTMF signals for the access code stored in non-volatile memory 32 followed by the DTMF signals for the telephone number stored in the temporary memory 30. If it is determined at 66 that the number is not a long distance number, only the number stored in temporary memory 30 is dialed at 68 without the access code inserted before it. After the dialer 36 is finished dialing the number, the logic 34 signals the power switch 23 to place the device 10 in the idle state (50 in FIG. 3).

The DTMF interceptor and dialer described above provides a simple, elegant, and cost effective solution to the problem of dialing a seven digit access code each time a long distance number is dialed. The apparatus described above is ideally suited for distribution by long distance access providers to their customers and prospective customers with the provider access code pre-programmed into the non-volatile memory. With the present invention, a long distance service customer can change long distance service providers by simply plugging the invention into any telephone jack in their home. Once the device is coupled to the customer's home phone line in this manner, numbers dialed from every telephone in the house will be intercepted and, if long distance numbers, redialed by the invention with the appropriate access code.

In addition to the above describe embodiment, the invention may be embodied in a manner in which a consumer can program the unit to contain any access code chosen by the consumer. Programming may be easily effected using the keypad of any telephone connected to the same subscriber line as the programmable unit. For example, a programming convention might require the pressing of the keys "#-#-*" then entering the seven digit access code. According to this embodiment, the consumer preferably may change the access code at any time.

Figure 4:
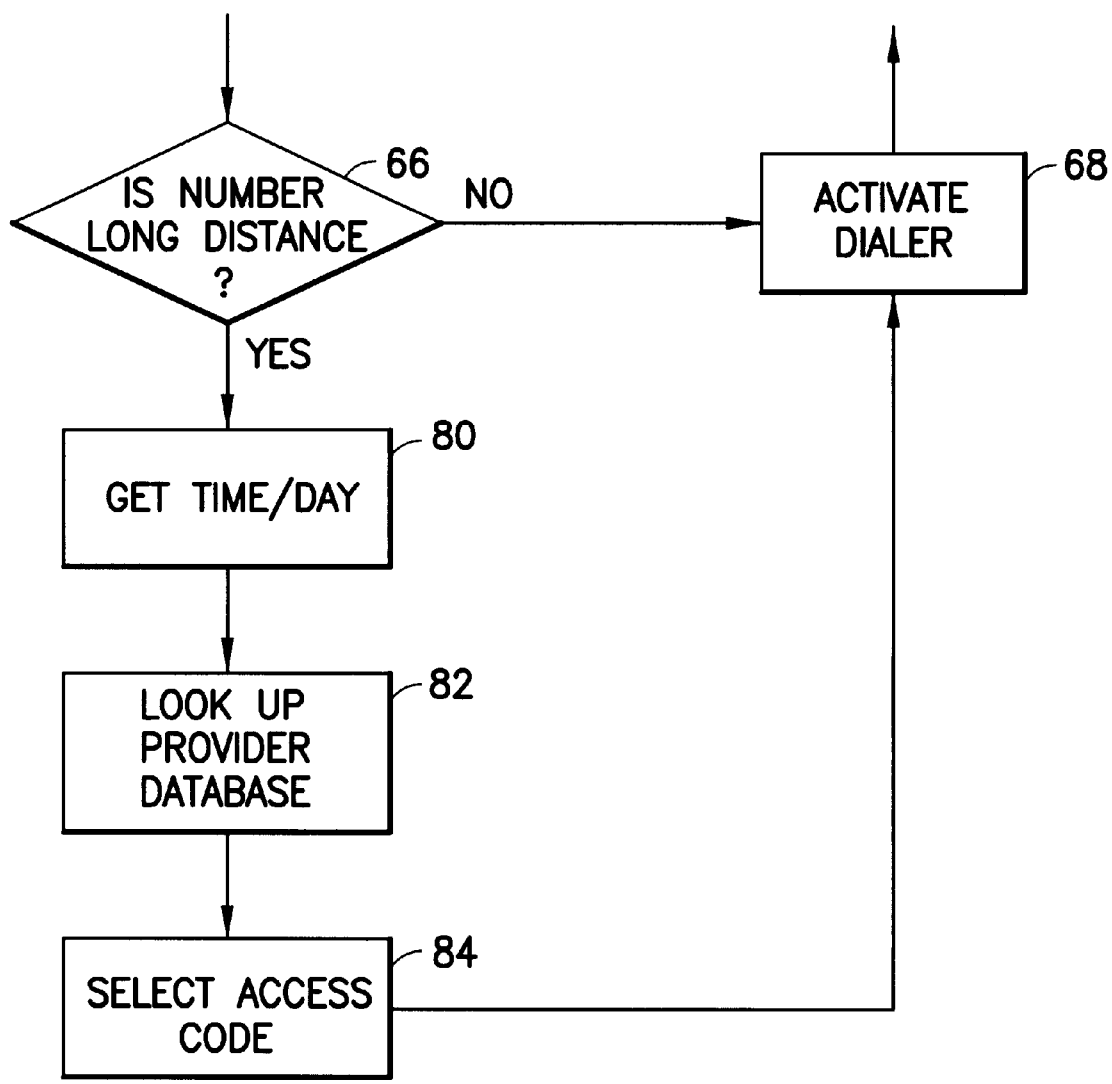
FIG. 4 is a flow chart illustrating operation of an alternate embodiment of the invention.

Referring now to FIGS. 2 and 4, a slightly more sophisticated embodiment of the invention is provided with a programmable database 38 and enhanced logic 34 whereby a long distance service consumer may select among several service providers based on several criteria. According to this embodiment of the invention, the programmable database 38 includes information about different service providers such as which providers provide the best rates for certain times of day and days of the week. The logic 34 includes means for detecting the present day and time (at 80 in FIG. 4), and means for searching the database at 82 to determine which access provider has the best rate for the present day and time. The logic then selects the best access code at 84 and appends it to the dialed number before activating the dialer at 68.

Those skilled in the art will appreciate that the database 38 may also contain information about which service providers provide the best rates to certain locations. In that case, the logic 34 will be programmed to analyze numbers dialed to determine their location and choose an access number on that basis or on that basis as well as on the time and day of week. It will be appreciated that the programming of the database and the logic may be effected via a telephone keypad as described above. In addition, however, the unit according to the invention may be provided with a port for coupling it to a personal computer so that the unit may be programmed with the aid of software running on the personal computer. Moreover, updated information about service providers and rates may be made available via a subscription to download data or receive data on a disk through the mail. Thus, a consumer may update the database 38 via a personal computer so that the latest rates and restrictions are always available to the logic 34.

According to another embodiment of the invention, the database 38 may be provided with a number of different access codes which are manually selected by the consumer after dialing a long distance number. For example, one long distance service provider may provide the best rates for calls lasting under ten minutes whereas another long distance provider may provide the best razes for calls lasting longer than ten minutes. Thus, according to this embodiment of the invention, the consumer may press, for example "#1" to select the first provider and "#2" to select the second provider.

There have been described and illustrated herein several embodiments of a DTMF interceptor and dialer. While particular embodiments of the invention have been described, it is not intended that the invention be limited thereto, as it is intended that the invention be as broad in scope as the art will allow and that the specification be read likewise. Thus, while particular hardware have been disclosed, it will be appreciated that other hardware could be utilized to effect the methods of the invention. Also, while temporary memory and permanent (non-volatile) memory been shown, it will be recognized that other types of memory could be used with similar results obtained. Moreover, while particular configurations have been disclosed in reference to harmonics generator, it will be appreciated that other configurations could be used as well. It will also be understood that in lieu of transmitting "row frequencies" to block recognition of DTMF signals, "column frequencies" would also work. Moreover, although the presently preferred embodiment transmits the same harmonics for every DTMF digit, each digit could be blocked with a different harmonic. Furthermore, while a dialer has been disclosed, it will be understood that the dialer may be embodied in many different ways in order to transmit DTMF signals onto the subscriber line. In addition, the invention has been described with reference to an energy sensor. It will be appreciated that the energy sensor may be embodied in many ways and may include a rapid DTMF sensor, i.e. a sensor which recognized DTMF signals in significantly less than 40 milliseconds. It will also be recognized that the invention may be implemented without the energy sensor and harmonics may be generated continuously from the time off-hook is detected until the end of dialing is detected. It will therefore be appreciated by those skilled in the art that yet other modifications could be made to the provided invention without deviating from its spirit and scope as so claimed.

What is claimed is:

1. An apparatus for intercepting a first set of DTMF tones on a telephone line and for dialing a second set of DTMF tones on the telephone line, said apparatus comprising:

a) monitoring means for monitoring the telephone line for the presence of the first set of DTMF tones, b) first transmitting means coupled to said monitoring means for transmitting at least one DTMF harmonic onto the telephone line when the presence of the first set of DTMF tones is detected, c) recording means for recording the first set of DTMF or the digits the first set of DTMF tones represent, and d) second transmitting means coupled to said recording means for transmitting the second set of DTMF tones onto the telephone line.

2. An apparatus according to claim 1, wherein:

the second set of DTMF tones includes the first set of DTMF tones together with other DTMF tones.

3. An apparatus according to claim 2, further comprising:

e) analyzing means coupled to said recording means for analyzing the first set of DTMF tones or the digits the first set of DTMF tones represent to determine what type of telephone number the first set of DTMF tones represents, wherein said second transmitting means is responsive to said analyzing means such that the first set of DTMF tones or digits are transmitted as DTMF tones together with said other DTMF tones when it is determined that the first set of tones or digits represent one type of telephone number and the first set of DTMF tones or digits are transmitted as DTMF tones without said other DTMF tones when it is determined that the first set of tones or digits represent another type of telephone number.

4. An apparatus according to claim 3, wherein:

said one type of telephone number is a long distance number, said another type of telephone number is a local number, and said other DTMF tones represent a long distance service provider access code.

5. An apparatus according to claim 4, further comprising:
f) database means for storing access codes or DTMF tones representing access codes for a plurality of long distance service providers, wherein
said analyzine means includes means for selecting an access code or set of DTMF tones representing an access code from said database means based on at least one variable.

6. An apparatus according to claim 5, wherein:
said at least one variable includes day of week.

7. An apparatus according to claim 5, wherein:
said at least one variable includes time of day.

8. An apparatus according to claim 5, wherein:
said at least one variable includes at least one of the recorded DTMF tones or digits.

9. An apparatus according to claim 1, wherein:
said monitoring means includes an energy sensor which senses any fixed frequency signal within a range of frequencies.

10. An apparatus according to claim 1, wherein:
said monitoring means includes a DTMF detector.

11. An apparatus according to claim 1, wherein:
said first transmitting means transmits at least three simultaneous tones each of which is an harmonic of a DTMF tone.

12. An apparatus according to claim 1, wherein:
said recording means includes a DTMF detector which detects DTMF signals in the presence of the at least one DTMF harmonic transmitted by said first transmitting means.

13. An apparatus according to claim 1, wherein:
said recording means includes means for filtering out the at least one DTMF harmonic transmitted by said first transmitting means.

14. A method for intercepting a first set of DTMF tones on a telephone line and for transmitting a second set of DTMF tones on the same telephone line, said method comprising:

a) monitoring the telephone line for the presence of the first set of DTMF tones;
b) transmitting at least one DTMF harmonic onto the telephone line when the presence the first set of DTMF tones is detected;
c) recording the first set of DTMF tones or the digits they represent; and
d) transmitting onto the telephone line a the second set of DTMF tones.

15. A method according to claim 14, wherein:
the second set of DTMF tones includes the first set of DTMF tones plus additional DTMF tones.

16. A method according to claim 15, wherein:
the additional DTMF tones represent a long distance service provider access code.

17. A method according to claim 16, further comprising:
e) prior to transmitting the second set of DTMF tones, determining whether the first set of DTMF tones correspond to a long distance telephone number.

18. An apparatus for blocking the transmission of DTMF tones from a telephone set onto a telephone line, said apparatus comprising:
a) monitoring means for monitoring the telephone line for the presence of DTMF tones; and
b) transmitting means coupled to said monitoring means for transmitting at least one DTMF harmonic onto the telephone line when the presence of DTMF tones is detected.

19. A method for blocking the transmission of DTMF tones from a telephone set onto a telephone line, said apparatus comprising:
a) monitoring the telephone line for the presence of DTMF tones; and
b) transmitting at least one DTMF harmonic onto the telephone line when the presence of DTMF tones is detected.

* * * * *